United States Patent
Liu

(10) Patent No.: US 9,069,601 B2
(45) Date of Patent: Jun. 30, 2015

(54) METHOD AND APPARATUS FOR CONTROLLING TASK EXECUTION

(71) Applicant: Huawei Technologies Co., Ltd., Shenzhen, Guangdong (CN)

(72) Inventor: Yu Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 13/718,584

(22) Filed: Dec. 18, 2012

(65) Prior Publication Data

US 2013/0227576 A1    Aug. 29, 2013

(30) Foreign Application Priority Data

Feb. 28, 2012  (CN) .......................... 2012 1 0047796

(51) Int. Cl.
  *G06F 9/46*   (2006.01)
  *G06F 1/32*   (2006.01)
  *H04W 52/02*  (2009.01)

(52) U.S. Cl.
  CPC ............... *G06F 9/46* (2013.01); *G06F 1/3209* (2013.01); *G06F 1/329* (2013.01); *H04W 52/0235* (2013.01); *Y02B 60/144* (2013.01)

(58) Field of Classification Search
  CPC .................................................. G06F 1/3209
  See application file for complete search history.

(56) References Cited

U.S. PATENT DOCUMENTS

| 7,760,676 | B2 | 7/2010 | Demirhan et al. |
| 2008/0186892 | A1 | 8/2008 | Damnjanovic |
| 2009/0140844 | A1* | 6/2009 | Roychowdhury ....... 340/309.16 |
| 2009/0154385 | A1 | 6/2009 | Makhija et al. |

FOREIGN PATENT DOCUMENTS

CN        101897224 A     11/2010

* cited by examiner

*Primary Examiner* — Camquy Truong

(57) ABSTRACT

A method and an apparatus for controlling task execution are disclosed in the present invention which relates to the field of wireless communications technologies, addressing the problem that power consumption of a terminal in standby mode is wasted because tasks of the terminal in a standby state are fixed and corresponding time periods cannot be flexibly set for different tasks. The method includes: receiving standby state parameters sent by a terminal management module; configuring the terminal according to the standby parameters so that the terminal enters a sleeping state; enabling a timer to start timing; stopping timing when the time of the timer reaches the time point at which a current task will be executed; configuring the terminal according to working state parameters of the terminal so that the terminal enters a working state; and receiving paging information sent by the terminal management module.

10 Claims, 5 Drawing Sheets

METHOD AND APPARATUS FOR CONTROLLING TASK EXECUTION

CROSS-REFERENCE TO RELATED APPLICATIONS

This application claims priority to Chinese Patent Application No. 201210047796.7, filed on Feb. 28, 2012, which is hereby incorporated by reference in its entirety.

FIELD OF THE INVENTION

The present invention relates to the field of wireless communications technologies, and in particular to a method and an apparatus for controlling task execution.

BACKGROUND OF THE INVENTION

According to standard cellular network standby technologies, a terminal in the standby state needs to receive paging information delivered by a network. To reduce standby power consumption of the terminal, a DRX (Discontinuous Reception, discontinuous reception) technology is put forward in a mobile communications protocol; that is, the network periodically initiates paging to the terminal, and the terminal only needs to wake up and receive information from a paging channel at a specified time of each period, thereby reducing the time for waking up the terminal in the standby state and reducing standby power consumption of the terminal. The standby power consumption of the terminal is approximately proportional to the time for processing various tasks in the standby state.

The inventor finds that even when the DRX technology is used, the standby power consumption of the terminal still cannot be reduced significantly. The range of a DRX period is comparatively small and cannot support a longer period. In addition, the DRX period, as a parameter of the whole network, generally remains unchanged once being set. Furthermore, tasks of the terminal in the standby state are fixed, and corresponding time periods cannot be flexibly set for different tasks, thereby increasing the standby power consumption of the terminal.

SUMMARY OF THE INVENTION

Embodiments of the present invention provide a method and an apparatus for controlling task execution, so that different sleep periods are used when different terminals are executing different tasks and standby power consumption of a terminal is significantly reduced.

To achieve the preceding objectives, the embodiments of the present invention adopt the following technical solutions:

A method for controlling task execution includes:
receiving standby parameters sent by a terminal management module, where the standby parameters include the time point at which a current task is to be executed;
configuring a terminal according to the standby parameters so that the terminal enters a sleeping state;
enabling a timer to start timing;
stopping timing when the time of the timer reaches the time point at which the current task will be executed, and configuring the terminal according to working state parameters of the terminal so that the terminal enters a working state; and
receiving paging information sent by the terminal management module, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is received.

A method for controlling task execution includes:
querying, according to an identifier of a terminal, a task calendar of the terminal corresponding to the identifier in a self-stored preconfigured lookup table, where the preconfigured lookup table includes the identifier of the terminal and the task calendar corresponding to the terminal, and the task calendar includes tasks and time points at which the tasks will be executed;
sending standby parameters to the terminal, where the standby parameters include the time point at which a current task will be executed;
enabling a timer to start timing;
stopping timing when the time of the timer reaches the time point at which the current task will be executed; and
sending paging information to the terminal, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is sent.

A terminal includes:
a receiving unit, adapted to receive standby parameters sent by a terminal management module, where the standby parameters include the time point at which a current task will be executed;
a state processing unit, adapted to configure the terminal according to the standby parameters so that the terminal enters a sleeping state; and
a timer enabling unit, adapted to enable a timer to start timing; where
the state processing unit is further adapted to stop timing when the time of the timer reaches the time point at which the current task will be executed, and configure the terminal according to working state parameters of the terminal so that the terminal enters a working state; and
the receiving unit is further adapted to receive paging information sent by the terminal management module, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is received.

A terminal management module includes:
a querying unit, adapted to query, according to an identifier of a terminal, a task calendar of the terminal corresponding to the identifier in a self-stored preconfigured lookup table, where the preconfigured lookup table includes the identifier of the terminal and the task calendar corresponding to the terminal, and the task calendar includes tasks and time points at which the tasks will be executed;
a sending unit, adapted to send standby parameters to the terminal, where the standby parameters include the time point at which a current task will be executed;
a timer enabling unit, adapted to enable a timer to start timing; and
a processing unit, adapted to stop timing when the time of the timer reaches the time point at which the current task will be executed; where
the sending unit is further adapted to send paging information to the terminal, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is sent.

According to the method and the apparatus for controlling task execution provided in the embodiments of the present invention, a corresponding task and the time point at which the task will be executed are found in a task calendar according to the identifier of a terminal, where the task calendar is preconfigured by a terminal management module on a network side; the terminal starts timing and enters a sleeping state; meanwhile, the terminal management module also starts timing; after stopping timing, the terminal management module sends paging information carrying the task to the terminal; and the terminal receives the paging information, thereby addressing the problem that standby power consumption of the terminal is wasted because tasks of the terminal in a standby state are fixed and corresponding time periods cannot be flexibly set for different tasks, and implementing provision of different sleep periods for different tasks of different terminals. This significantly reduces standby power consumption of the terminal.

DETAILED DESCRIPTION OF THE EMBODIMENTS

With reference to the accompanying drawings, the following describes in detail a method and an apparatus for controlling task execution in embodiments of the present invention.

Figure 1:
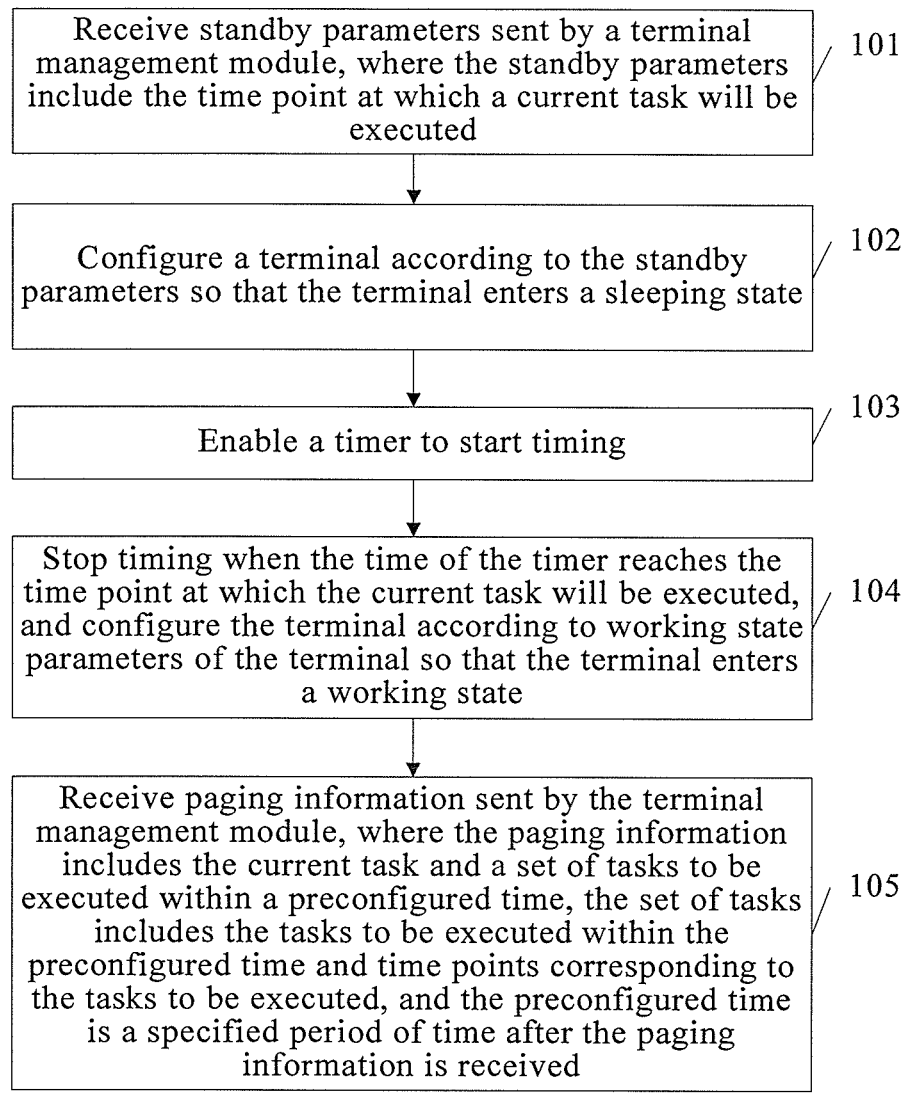
FIG. 1 is a flow chart of a method for controlling task execution according to an embodiment of the present invention.

An embodiment of the present invention provides a method for controlling task execution. As shown in FIG. 1, the method includes the following steps:

101. Receive standby parameters sent by a terminal management module, where the standby parameters include the time point at which a current task will be executed.

102. Configure a terminal according to the standby parameters so that the terminal enters a sleeping state.

103. Enable a timer to start timing.

104. Stop timing when the time of the timer reaches the time point at which the current task will be executed, and configure the terminal according to working state parameters of the terminal so that the terminal enters a working state.

105. Receive paging information sent by the terminal management module, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is received.

According to the method for controlling task execution provided in this embodiment of the present invention, a terminal receives standby parameters sent by a terminal management module, where the standby parameters include the time point at which a current task will be executed; configures the terminal according to the standby parameters so that the terminal enters a sleeping state; enables a timer to start timing; stops timing when the time of the timer reaches the time point at which the current task will be executed; and receives paging information sent by the terminal management module, thereby addressing the problem that standby power consumption of the terminal is increased because tasks of the terminal in a standby state are fixed and corresponding time periods cannot be flexibly set for different tasks, and implementing execution of different sleep periods for different tasks of different terminals. This significantly reduces standby power consumption of the terminal.

Figure 2:
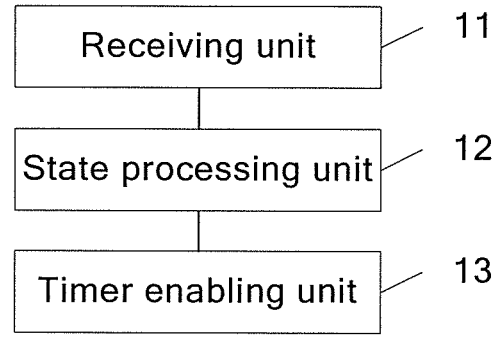
FIG. 2 is a structural diagram of a terminal according to an embodiment of the present invention.

Accordingly, an embodiment of the present invention provides a terminal, as shown in FIG. 2, including a receiving unit 11, a state processing unit 12, and a timer enabling unit 13, where the receiving unit 11 is adapted to receive standby parameters sent by a terminal management module, where the standby parameters include the time point at which a current task will be executed;

the state processing unit 12 is adapted to configure the terminal according to the standby parameters so that the terminal enters a sleeping state;

the timer enabling unit 13 is adapted to enable a timer to start timing;

the state processing unit 12 is further adapted to stop timing when the time of the timer reaches the time point at which the current task will be executed, and configure the terminal according to working state parameters of the terminal so that the terminal enters a working state; and the receiving unit 11 is further adapted to receive paging information sent by the terminal management module, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is received.

According to the terminal provided in this embodiment of the present invention, a receiving unit receives the time point at which a current task will be executed, a state processing unit configures the terminal according to standby parameters so that the terminal enters a sleeping state; a timer enabling unit enables a timer to start timing; the timing is stopped when the time of the timer reaches the time point at which the current task will be executed; a state processing unit configures the terminal according to working state parameters of the terminal so that the terminal enters a working state; the receiving unit receives paging information sent by a terminal management module, thereby addressing the problem that standby power consumption of the terminal is wasted because tasks of the terminal in a standby state are fixed and corresponding time periods cannot be flexibly set for different tasks, and implementing execution of different sleep periods for different tasks of different terminals. This significantly reduces standby power consumption of the terminal.

Figure 3:
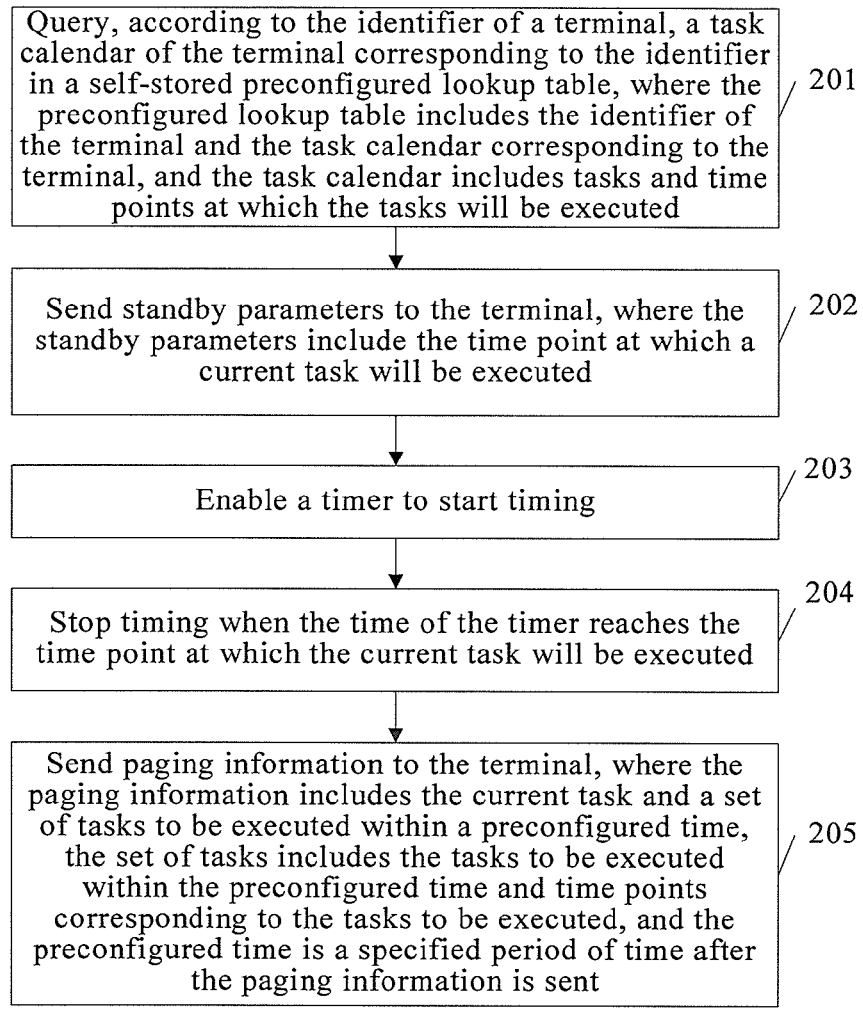
FIG. 3 is a flow chart of a method for controlling task execution according to an embodiment of the present invention.

An embodiment of the present invention provides a method for controlling task execution. As shown in FIG. 3, the method includes the following steps:

201. Query, according to an identifier of a terminal, a task calendar of the terminal corresponding to the identifier in a self-stored preconf igured lookup table, where the preconf igured lookup table includes the identifier of the terminal and the task calendar corresponding to the terminal, and the task calendar includes tasks and time points at which the tasks will be executed.

202. Send standby parameters to the terminal, where the standby parameters include the time point at which a current task will be executed.

203. Enable a timer to start timing.

204. Stop timing when the time of the timer reaches the time point at which the current task will be executed.

205. Send paging information to the terminal, where the paging information includes the current task and a set of tasks to be executed within a preconfigured time, the set of tasks includes the tasks to be executed within the preconf igured time and time points corresponding to the tasks to be executed, and the preconfigured time is a specified period of time after the paging information is sent According to the method for controlling task execution provided in this embodiment of the present invention, a terminal management module on a network side queries, according to the identifier of a terminal, a task calendar of the terminal corresponding to the identifier in a self-stored preconfigured lookup table; sends standby parameters to the terminal, where the standby parameters include the time point at which a current task will be executed; enables the timer to start timing and stops timing when the time of the timer reaches the time point at which the current task will be executed; and sends the terminal paging information carrying the current task and a set of tasks to be executed within a preconfigured time in the paging information, thereby addressing the problem that standby power consumption of the terminal is wasted because tasks of the terminal in a standby state are fixed and corresponding time periods cannot be flexibly set for different tasks, and implementing provision of different sleep periods for different tasks of different terminals, This significantly reduces standby power consumption of the terminal.

Figure 4:
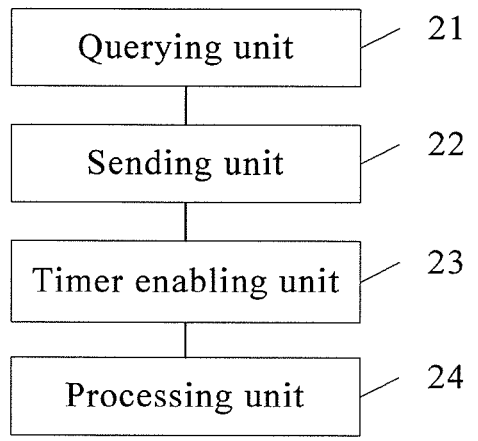
FIG. 4 is a structural diagram of a terminal management module according to an embodiment of the present invention.

Accordingly, an embodiment of the present invention further provides a terminal management module, as shown in FIG. 4, including a querying unit 21, a sending unit 22, a timer enabling unit 23, and a processing unit 24, where the querying unit 21 is adapted to query, according to an identifier of a terminal, a task calendar of the terminal corresponding to the identifier in a self-stored preconfigured lookup table, where the preconfigured lookup table includes the identifier of the terminal and the task calendar corresponding to the terminal, and the task calendar includes tasks and time points at which the tasks will be executed;

the sending unit 22 is adapted to send standby parameters to the terminal, where the standby parameters include the time point at which a current task will be executed;

the timer enabling unit 23 is adapted to enable a timer to start timing;

the processing unit 24 is adapted to stop timing when the time of the timer reaches the time point at which the current task will be executed; and the sending unit 22 is further adapted to send paging information to the terminal, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is sent.

According to the terminal management module provided in this embodiment of the present invention, a querying unit finds a current task and the time point at which the current task will be executed; a first sending unit sends the time point at which the current task will be executed to a terminal; meanwhile, a timer is enabled to start timing; a processing unit stops timing when the time of the timer reaches the time point at which the current task will be executed; and the sending unit sends the terminal paging information carrying the current task and a set of tasks to be executed within a preconfigured time in the paging information, thereby addressing the problem that standby power consumption of the terminal is wasted because tasks of the terminal in a standby state are fixed and corresponding time periods cannot be flexibly set for different tasks, and implementing provision of different sleep periods for different tasks of different terminals. This significantly reduces standby power consumption of the terminal.

Figure 5:
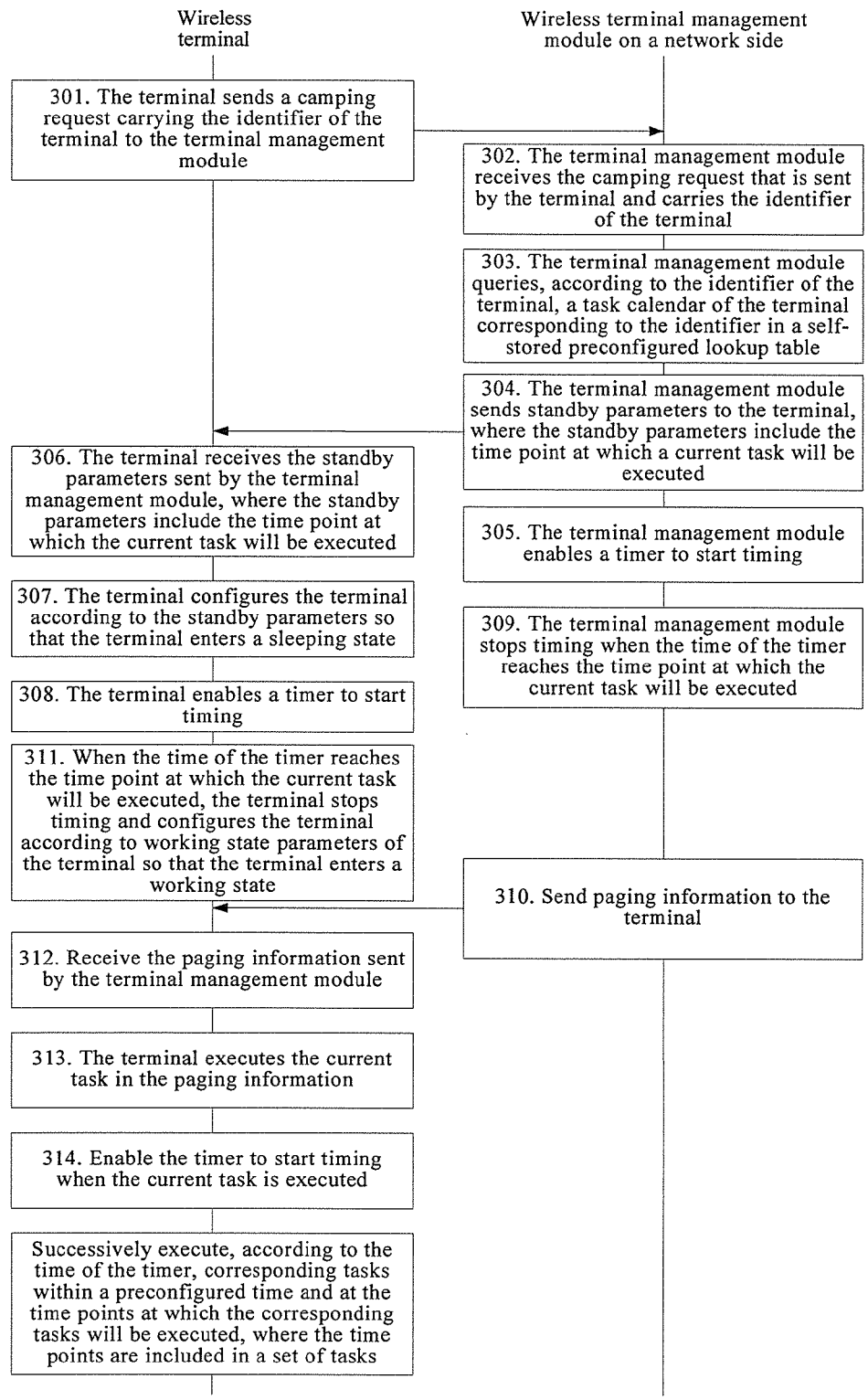
FIG. 5 is an overall flow chart of a method for controlling task execution according to an embodiment of the present invention.

In practical applications, after being switched on, a terminal performs initialization, searches for a network, and sends, after the network is found, a camping request carrying an identifier of the terminal. As shown in FIG. 5, the specific steps are as follows:

301. The terminal sends the camping request carrying the identifier of the terminal to a terminal management module.

302. The terminal management module receives the camping request that is sent by the terminal and carries the identifier of the terminal.

303. The terminal management module queries, according to the identifier of the terminal, a task calendar of the terminal corresponding to the identifier in a self-stored preconfigured lookup table, where the preconfigured lookup table includes the identifier of the terminal and the task calendar corresponding to the terminal, and the task calendar includes tasks and time points at which the tasks will be executed.

The preconfigured lookup table stores the identifier, the type, and the task calendar corresponding to the terminal. The task calendar includes the tasks to be executed by the terminal and the time points at which the tasks will be executed.

304. The terminal management module sends standby parameters to the terminal, where the standby parameters include the time point at which a current task will be executed.

305. The terminal management module enables a timer to start timing.

306. The terminal receives the standby parameters sent by the terminal management module, where the standby parameters include the time point at which the current task will be executed.

307. The terminal configures the terminal according to the standby parameters so that the terminal enters a sleeping state.

308. The terminal enables a timer to start timing.

The terminal is configured according to the standby parameters so that the terminal enters the sleeping state. At this time, the terminal no longer receives any information sent by the terminal management module other than that the timer is performing timing and basis work is maintained.

309. The terminal management module stops timing when the time of the timer reaches the time point at which the current task will be executed.

310. Send paging information to the terminal, where the paging information includes the current task and a set of tasks to be executed within a preconfigured time, the set of tasks includes the tasks to be executed within the preconfigured time and time points corresponding to the tasks to be executed, and the preconfigured time is a specified period of time after the paging information is sent.

The timing is stopped when the time of the timer reaches the time point at which the current task will be executed. Paging is initiated to the terminal. The paging information carries the current task and the set of tasks to be executed within the preconfigured time, and is transmitted through a paging channel.

311. When the time of the timer reaches the time point at which the current task will be executed, the timing is stopped and the terminal configures the terminal according to working state parameters of the terminal so that the terminal enters a working state.

312. Receive the paging information sent by the terminal management module, where the paging information includes the current task and the set of tasks to be executed within the preconfigured time, the set of tasks includes the tasks to be executed within the preconfigured time and the time points corresponding to the tasks to be executed, and the preconfigured time is the specified period of time after the paging information is received.

313. The terminal executes the current task in the paging information.

314. When the current task is executed, enable the timer to start timing.

315. According to the time of the timer, corresponding tasks, are successively executed within the preconfigured time and at the time points at which the corresponding tasks will be executed, where the time points are included in the set of the tasks.

The timing is completed when the time point at which the current task will be executed is reached. The terminal is waken up, enters the working state, searches for the network, receives the paging information through the paging channel, executes the current task, and reports the result if necessary. The terminal management module receives and stores the reported information.

The set of tasks to be executed within the preconfigured time is a set of tasks to be executed after the terminal receives the paging information.

The timing is stopped when the preconfigured time is reached. The terminal management module sends new paging information to the terminal, where the new paging information includes a set of new tasks to be executed within a new preconfigured time, and the set of new tasks includes tasks to be executed within the new preconfigured time and time points corresponding to the tasks to be executed.

Within the preconfigured time, the terminal may execute corresponding tasks according to different time points in the set of tasks, rather than that all tasks are executed within a fixed period in the prior art, thereby reducing standby power consumption.

Figure 6:
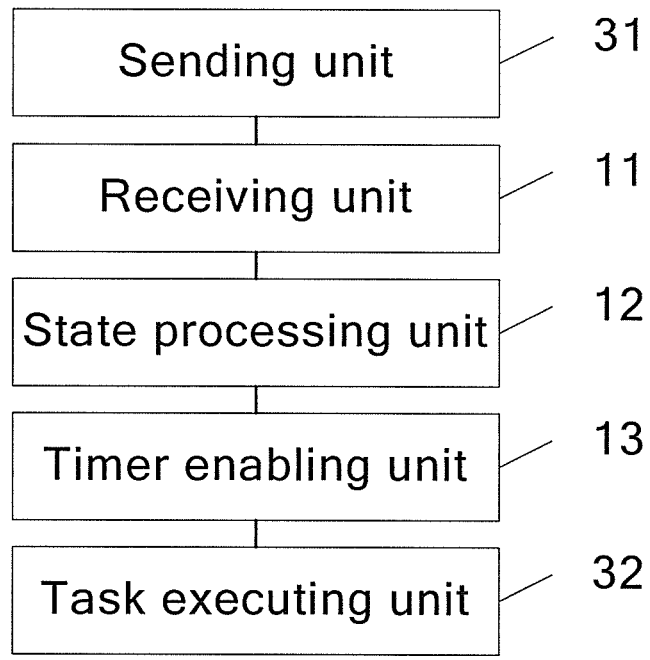
FIG. 6 is an overall structural diagram of a terminal according to an embodiment of the present invention.

Accordingly, an embodiment of the present invention provides a terminal, as shown in FIG. 6, further including a sending unit 31 and a task executing unit 32, where the sending unit 31 is adapted to send a camping request carrying an identifier of the terminal to a terminal management module;

the task executing unit 32 is adapted to execute a current task in paging information;

a timer enabling unit in the terminal is further adapted to enable a timer to start timing when the current task is executed; and the task executing unit is further adapted to successively execute, according to the time of the timer, corresponding tasks within a preconfigured time and at time points at which the corresponding tasks will be executed, where the time points are included in a set of tasks.

Figure 7:
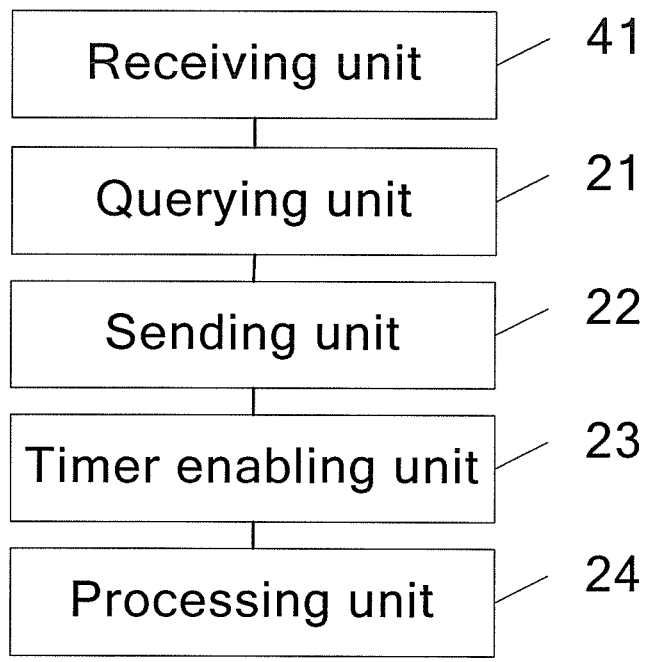
FIG. 7 is an overall structural diagram of a terminal management module according to an embodiment of the present invention.

An embodiment of the present invention provides a terminal management module, as shown in FIG. 7, further including a receiving unit 41 which is adapted to receive a camping request that is sent by a terminal and carries an identifier of the terminal.

The present invention may apply in an Internet of Things technology. The Internet of Things technology is an important technology that emerges lately. With the Internet still as its core and basis, the Internet of Things is a network extended and expanded on the basis of the Internet, but its user ends are extended and expanded between any things to perform information exchanges and communication. In an Internet of Things system, network connections may be borne by an existing wired network, wireless network, and cellular network, and terminal nodes on the network may be "objects" of different forms. These "object" terminals may be classified from many perspectives, for example, from the perspective of mobility requirements on the terminals, they may be classified into: terminals that move frequently, mobile terminals, and static terminals; and from the perspective of power supply characteristics of the objects, they may be classified into: those powered by direct power supplies and those powered by indirect power supplies (that is, for example, powered by batteries).

For terminals of the Internet of Things powered by indirect power supplies, it is a key technology to reduce power consumption of the terminals because each of the terminals needs to be configured with an independent power supply (such as a lithium ion battery or a coin battery). When a cellular network standard is adopted, the standby power consumption of a terminal is generally at milliampere level, which differs from the requirements of standby power consumption on some terminals of the Internet of Things in quantity. This is mainly because existing protocols mainly define terminals in the form of a mobile phone, and therefore cannot meet the requirements on the terminals of the Internet of Things. According to technologies in the present invention, however, different standby policies may be implemented according to different types of terminals so that the terminals adopt significantly different standby modes, thereby significantly reducing the standby power consumption of the terminals of the Internet of Things.

Figure 8:
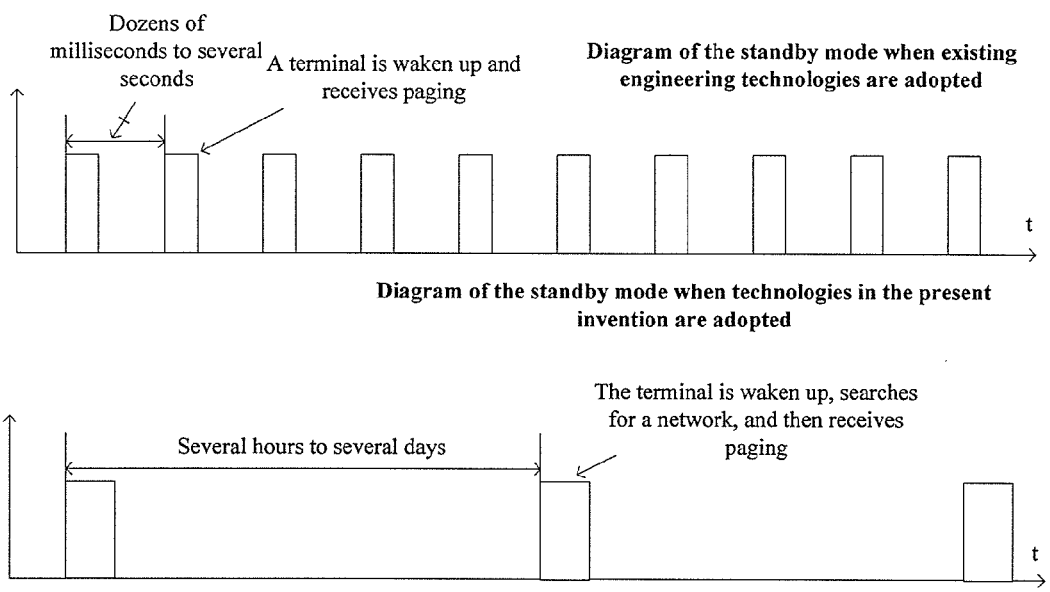
FIG. 8 is a diagram of a comparison between standby power consumption when existing engineering technologies are adopted and that when technologies in the present invention are adopted according to an embodiment of the present invention.

FIG. 8 is a diagram of a comparison between standby power consumption when existing engineering technologies are adopted and that when technologies in the present invention are adopted. As shown in this figure, the average standby current may be obtained by calculating the integral area of the shadow part according to the existing engineering level. The standby power consumption of a terminal may be reduced by 1-2 levels in quantity by lengthening a wake-up period by 1-3 levels in quantity.

A terminal management module sends paging information carrying a set of tasks to a terminal of the Internet of Things, the terminal executes corresponding tasks according to time points at which the corresponding tasks will be executed in the set of tasks, and adopts different sleep periods for different tasks according to execution time points, thereby reducing standby power consumption.

The foregoing descriptions are merely exemplary embodiments of the present invention, but not intended to limit the protection scope of the present invention. Any variation or replacement made by persons skilled in the art without departing from the spirit of the present invention shall fall within the protection scope of the present invention. Therefore, the scope of the present invention shall be subject to the appended claims.

What is claimed is:

1. A method for controlling task execution, the method comprising:
   receiving standby parameters sent by a terminal management module, wherein the standby parameters comprise the time point at which a current task will be executed;
   configuring a terminal according to the standby parameters so that the terminal enters a sleeping state;
   enabling a timer to start timing;
   stopping timing when the time of the timer reaches the time point at which the current task will be executed, and configuring the terminal according to working state parameters of the terminal so that the terminal enters a working state; and
   receiving paging information sent by the terminal management module, wherein the paging information comprises the current task and a set of tasks to be executed within a preconfigured time, the set of tasks comprises the tasks to be executed within the preconfigured time and time points corresponding to the tasks to be executed, and the preconfigured time is a specified period of time after the paging information is received.

2. The method according to claim 1, wherein before receiving standby parameters sent by a terminal management module, the method further comprises:
   sending a camping request carrying an identifier of the terminal to the terminal management module.

3. The method according to claim 1, wherein after receiving paging information sent by the terminal management module, the method further comprises:
   executing the current task in the paging information;
   when the current task is executed, enabling the timer to start timing; and
   successively executing, according to the time of the timer, corresponding tasks within the preconfigured time and at the time points at which the corresponding tasks will be executed, wherein the time points are comprised in the set of the tasks.

4. A method for controlling task execution, the method comprising:
   querying, according to an identifier of a terminal, a task calendar of the terminal corresponding to the identifier in a self-stored preconfigured lookup table, wherein the preconfigured lookup table comprises the identifier of the terminal and the task calendar corresponding to the terminal, and the task calendar comprises tasks and time points at which the tasks will be executed;
   sending standby parameters to the terminal, wherein the standby parameters comprise the time point at which a current task will be executed;
   enabling a timer to start timing;
   stopping timing when the time of the timer reaches the time point at which the current task will be executed; and
   sending paging information to the terminal, wherein the paging information comprises the current task and a set of tasks to be executed within a preconfigured time, the set of tasks comprises the tasks to be executed within the preconfigured time and time points corresponding to the tasks to be executed, and the preconfigured time is a specified period of time after the paging information is sent.

5. The method according to claim 4, wherein before querying, according to an identifier of a terminal, a task calendar of the terminal corresponding to the identifier in a self-stored preconfigured lookup table, the method further comprises:
   receiving a camping request that is sent by the terminal and carries the identifier of the terminal.

6. A terminal for use in a wireless network, the terminal comprising:
   a receiving unit, adapted to receive standby parameters sent by a terminal management module, wherein the standby parameters comprise the time point at which a current task will be executed;
   a state processing unit, configured to configure the terminal according to the standby parameters so that the terminal enters a sleeping state; and
   a timer enabling unit, configured to enable a timer to start timing; wherein
   the state processing unit is further configured to stop timing when the time of the timer reaches the time point at which the current task will be executed, and configure the terminal according to working state parameters of the terminal so that the terminal enters a working state;
   the receiving unit is further configured to receive paging information sent by the terminal management module, wherein the paging information comprises the current task and a set of tasks to be executed within a preconfigured time, the set of tasks comprises the tasks to be executed within the preconfigured time and time points corresponding to the tasks to be executed, and the preconfigured time is a specified period of time after the paging information is received; and
   a power supply, configured to power each unit in the terminal.

7. The terminal according to claim 6, further comprising:
   a sending unit, configured to send a camping request carrying an identifier of the terminal to the terminal management module.

8. The terminal according to claim 6, further comprising:
   a task executing unit, configured to execute the current task in the paging information;
   the timer enabling unit, further configured to enable a timer to start timing when the current task is executed; and
   the task executing unit, further configured to execute in sequence, according to the time of the timer, corresponding tasks within the preconfigured time and at time points at which the corresponding tasks will be executed, wherein the time points are comprised in the set of tasks.

9. A terminal management module, comprising:
   a querying unit, configured to query, according to an identifier of a terminal, a task calendar of the terminal corresponding to the identifier in a self-stored preconfigured lookup table, wherein the preconfigured lookup table comprises the identifier of the terminal and the task calendar corresponding to the terminal, and the task calendar comprises tasks and time points at which the tasks will be executed;
   a sending unit, configured to send standby parameters to the terminal, wherein the standby parameters comprise the time point at which a current task will be executed;
   a timer enabling unit, configured to enable a timer to start timing; and a processing unit, configured to stop timing when the time of the timer reaches the time point at which the current task will be executed; wherein the sending unit is further configured to send paging information to the terminal, wherein the paging information comprises the current task and a set of tasks to be executed within a preconfigured time, the set of tasks comprises the tasks to be executed within the preconfigured time and time points corresponding to the tasks to be executed, and the preconfigured time is a specified period of time after the paging information is sent.

10. The module according to claim 9, further comprising:

a receiving unit, configured to receive a camping request that is sent by the terminal and carries the identifier of the terminal.

* * * * *